United States Patent [19]

Honaga et al.

[11] Patent Number: 4,739,693
[45] Date of Patent: Apr. 26, 1988

[54] HYDRAULIC REACTION MECHANISM FOR POWER STEERING SYSTEM

[75] Inventors: Susumu Honaga, Aichi; Toshihiro Gotou, Okazaki, both of Japan

[73] Assignee: Toyoda Koki Kabushiki Kaisha, Kariya, Japan

[21] Appl. No.: 886,682

[22] Filed: Jul. 18, 1986

[30] Foreign Application Priority Data

Nov. 29, 1985 [JP] Japan ............... 60-185361[U]

[51] Int. Cl.$^4$ .................................. F15B 9/10
[52] U.S. Cl. ................. 91/370; 137/625.2 A; 91/375 A
[58] Field of Search ............ 91/370, 375 R, 375 A, 91/371, 372, 373, 374; 137/596.12, 625.24

[56] References Cited

U.S. PATENT DOCUMENTS

| | | | |
|---|---|---|---|
| 3,407,844 | 10/1968 | Linser | 91/374 X |
| 3,669,146 | 6/1972 | Adams | 91/375 A X |
| 3,877,540 | 4/1975 | Masuda et al. | 180/79.2 R |
| 4,034,825 | 7/1977 | Adams | 180/143 |
| 4,434,866 | 5/1984 | Duffy | 180/143 |
| 4,601,358 | 7/1986 | Kozuka et al. | 91/375 A X |

FOREIGN PATENT DOCUMENTS 2412548 9/1974 Fed. Rep. of Germany ... 91/375 A

Primary Examiner—Robert E. Garrett
Assistant Examiner—Mark A. Williamson
Attorney, Agent, or Firm—Oblon, Fisher, Spivak, McClelland & Maier

[57] ABSTRACT

There is disclosed a hydraulic reaction mechanism which is easy to manufacture and for use with an automotive power steering system. The mechanism has an input shaft and an output shaft which are rotatable relative to each other and mounted in a housing. A servovalve is mounted between the shafts and actuated in response to the relative movement between the shafts. Radially protruding portions are formed at the end of the input shaft that is on the side of the output shaft. The output shaft has an enlarged portion provided with cylinder holes in which reaction pistons are received. The pistons hydraulically push both sides of the radially protruding portions. The pistons have grooves in which retaining plates for restricting rearward movement of the pistons are engaged.

3 Claims, 5 Drawing Sheets

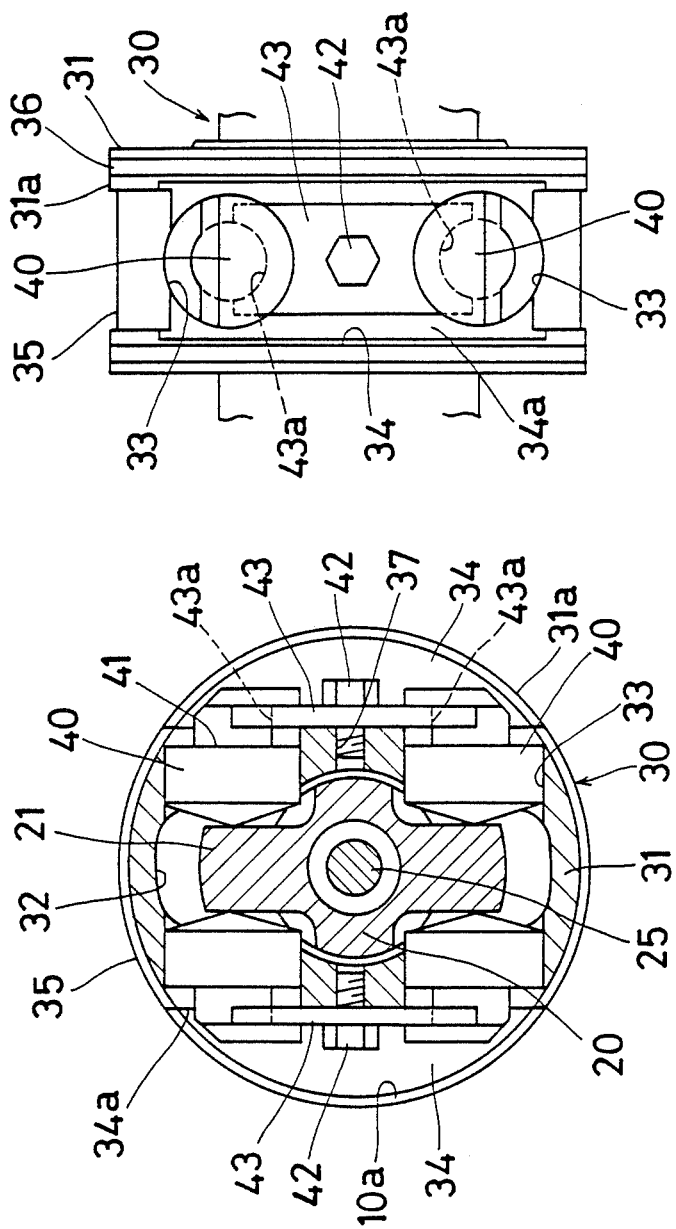

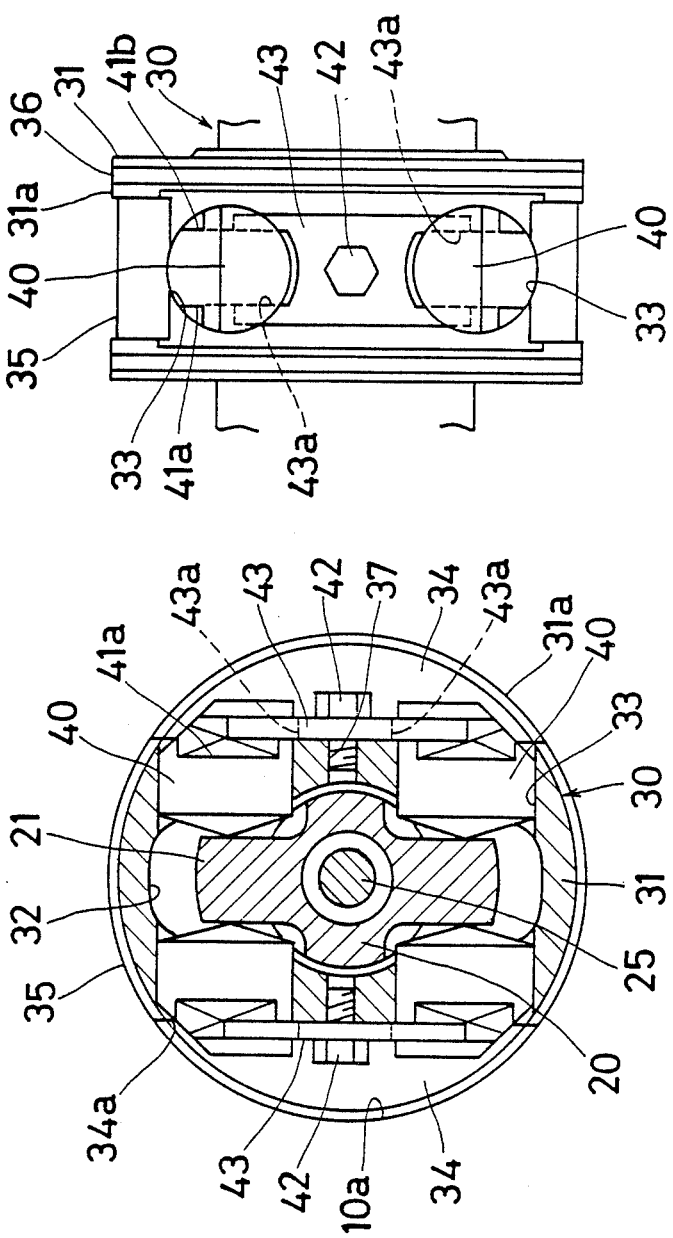

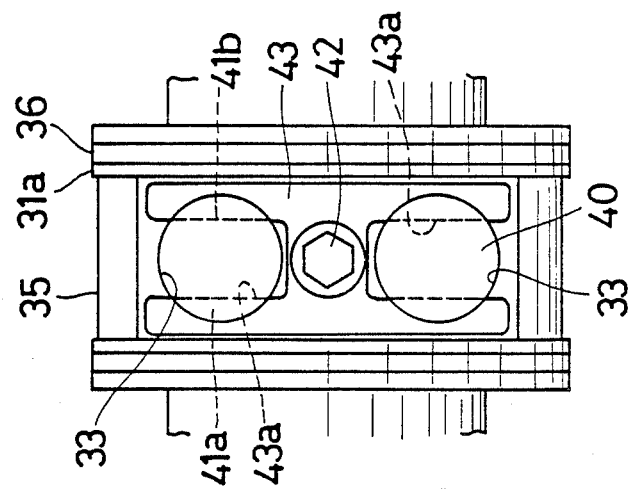
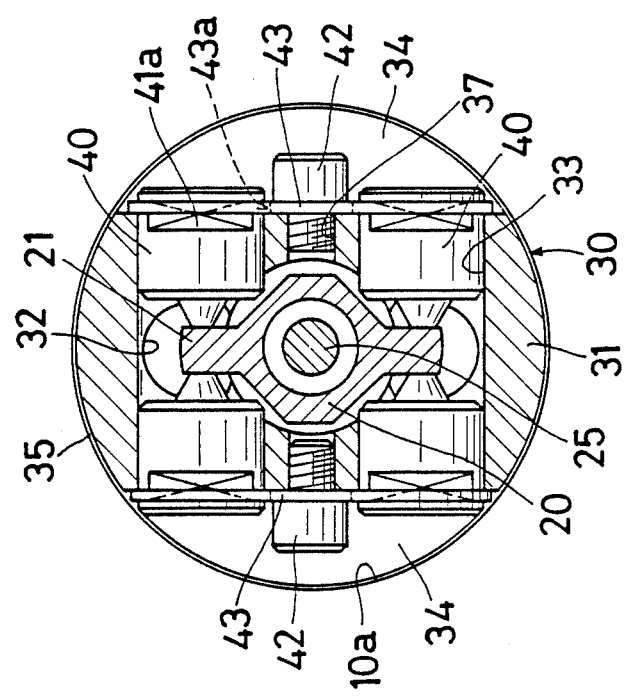

HYDRAULIC REACTION MECHANISM FOR POWER STEERING SYSTEM

FIELD OF THE INVENTION

The present invention relates to a hydraulic reaction mechanism which is used with the power-steering system of a motor vehicle and supplied with a hydraulic pressure depending on how much resistance to turning the steering wheel the driver encounters, for varying the resistance.

BACKGROUND OF THE INVENTION

A hydraulic reaction mechanism of this kind is disclosed in, for example, U.S. Pat. No. 4,434,866 issued to James J. Duffy. As shown in FIG. 1, this mechanism includes an input shaft 2 having radially protruding portions 2a. A sleeve 3 rotates with an output shaft (not shown), and is provided with grooves 3a in which the protruding portions 2a are received so as to be rotatable through a given angle. The power steering system with which this reaction mechanism is used has a housing 1. The sleeve 3 is fitted in the housing 1 in such a way that the outer periphery 3b of the sleeve can angularly move along the inner surface 1a of the housing 1. Reaction pistons 4 are fitted in the sleeve 3 to hydraulically push the sides of the protruding portions 2a in directions perpendicular to the sides. Since this reaction mechanism does not produce a large frictional loss, it operates efficiently by itself, and develops only a little hysteresis However, this reaction mechanism has the following disadvantages. First, since the reaction pistons 4 are simply inserted in their respective cylinder chambers 5 formed within the sleeve 3 so as to be slidable, when the sleeve 3 is inserted into the housing 1, the pistons 4 readily come off. Thus, the mechanism cannot be assembled in an efficient manner. Secondly, a step is formed on the recessed wall of each cylinder chamber 5 to limit the forward movement of each reaction piston. Therefore, the cylinder chambers 5 are cumbersome to machine.

SUMMARY OF THE INVENTION

It is an object of the present invention to provide a hydraulic reaction mechanism which is used with an automotive power steering system and which can be manufactured easily.

The above object is achieved by a hydraulic reaction mechanism comprising cylindrical reaction pistons whose outer surfaces have grooves running at right angles to the axis of the pistons, a rotary member rotating with the output shaft of a power steering system, and retaining plates rigidly fixed to the outer periphery of the rotary member and having front end portions engaged in the grooves, the retaining plates acting to restrict rearward movement of the pistons.

In one feature of the invention, the reaction pistons fitted in cylinder holes formed in the rotary member can rearwardly move a certain distance until they engage the retaining plates, whereupon no further rearward movement of the pistons is allowed. Consequently, when the output shaft is inserted into the housing, the pistons do not come off whatever posture the shaft assumes.

Other objects and features of the invention will appear in the course of the description thereof that follows.

BRIEF DESCRIPTION OF THE DRAWINGS

FIG. 3 is a cross-sectional view taken on line III—III of FIG. 2;

FIG. 4 is a side elevation of main portions of the hydraulic reaction mechanism shown in FIG. 2;

FIG. 5 is a view similar to FIG. 3, but showing another hydraulic reaction mechanism according to the invention;

FIG. 6 is a side elevation of main portions of the hydraulic reaction mechanism shown in FIG. 5;

FIG. 7 is a view similar to FIG. 3, but showing a further hydraulic reaction mechanism according to the invention; and FIG. 8 is a side elevation of main portions of the hydraulic reaction mechanism shown in FIG. 7.

DESCRIPTION OF THE PREFERRED EMBODIMENTS

Figure 1:
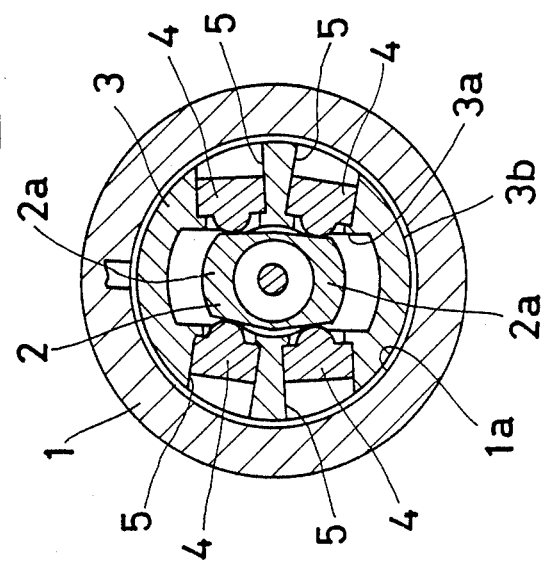
FIG. 1 is a cross-sectional view of main portions of a conventional hydraulic reaction mechanism for use with a power steering system.
Figure 2:
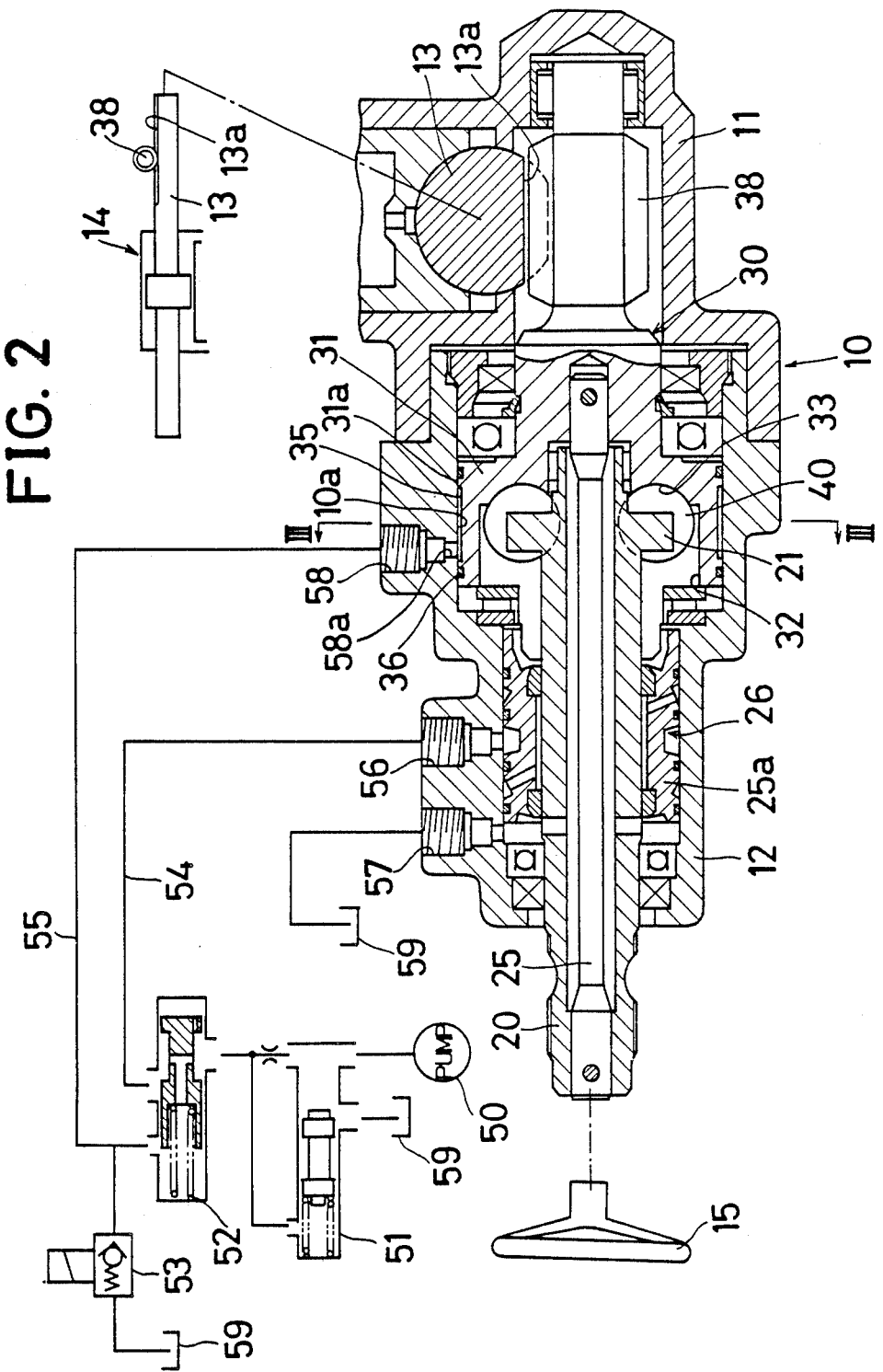
FIG. 2 is a vertical cross section of a hydraulic reaction mechanism for use with a power steering system, the mechanism being fabricated in accordance with the invention.

Referring first to FIG. 2, there is shown a hydraulic reaction mechanism according to the invention, as well as a power steering system with which the reaction mechanism is used. The power steering system has a housing 10 consisting of a gear housing 11 and a valve housing 12 coupled together. An output shaft 30 is rotatably held by two bearings. A rack 13 has teeth 13a which are in mesh with a pinion 38 on the output shaft 30. The rack 13 is held so as to be slidable in a direction perpendicular to the axis of the shaft 30. A power cylinder 14 mounted on the rack 13 is connected to steered wheels via a steering linkage (not shown). An input shaft 20 that is connected to a steering wheel 15 is coaxial, and rotatable, with the output shaft 30. The shafts 20 and 30 are resiliently connected together by a torsion bar 25 extending through the central hole in the input shaft 20. A servovalve 26 which operates in response to the rotation of the input shaft 20 relative to the output shaft 30 is mounted in the valve housing 12. The structure of this servovalve 26 is described in detail in, for example, U.S. Pat. No. 4,460,016 assigned to the assignee of the present invention.

Referring also to FIG. 3, two diametrically oppositely protruding portions 21 extend from the end of the input shaft 20 that is on the side of the output shaft 30. A rotatable enlarged portion 31 extends from the end of the output shaft 30 on the side of the input shaft 20. Grooves 32 which receive the radially protruding portions 21 such that these protruding portions can angularly move through a given angle are formed inside the enlarged portion 31.

As shown in FIGS. 3 and 4, an annular groove 35 is formed in the outer periphery 31a of the enlarged portion 31. Two flattened round grooves 34 are formed on the opposite sides of the grooves 32. The enlarged portion 31 is rotatably fitted in the housing 10 such that the outer periphery 31a of the enlarged portion 31 is in contact with the inner surface 10a of the housing 10 which has a cylindrical space in it. Both ends of the enlarged portion 31 are made liquid-tight by seals 36. The enlarged portion 31 is provided with two pairs of cylinder holes 33 that are in communication with the grooves 32 receiving the protruding portions 21. The cylinder holes 33 open into the grooves 34, and run at right angles to the bottoms 34a of the grooves 34. The two cylinder holes 33 of each pair are coaxial with each other. The axes of the cylinder holes 33 of the two pairs are equidistant from the axis of the shafts 20 and 30 and located on the opposite sides of this axis. As shown in FIG. 3, when the input shaft 20 is not rotated relative to the output shaft 30, i.e., when the steering wheel 15 is in its neutral position, the axes of the cylinder holes 33 extend at right angles to the respective radially protruding portions 21 in a plane perpendicular to the axis of the shafts 20 and 30. The bottoms 34a of the grooves 34 are formed with tapped holes 37 midway between the cylinder holes 33.

Referring still to FIGS. 3 and 4, reaction pistons 40 are fitted in the cylinder holes 33. The inner ends of the pistons 40 bear on the sides of their respective radially protruding portions 21. When hydraulic pressure is admitted to the grooves 34 as described later, the pistons 40 push their respective radially protruding portions 21. Each piston 40 is made of a cylindrical member whose inner end is conically shaped. An annular groove 41 of a certain width is formed at the outer end of each piston 40. That portion of the outer end of each piston 40 which is close to the inner surface 10a is beveled.

Retaining plates 43 are rigidly fixed to the bottoms 34a of the grooves 34 by bolts 42 screwed into the tapped holes 37. The plates 43 are provided with U-shaped cutouts 43a at their both ends. The portions surrounding the cutouts 43 engage the grooves 41 in the pistons 40. The width of the grooves 41 is larger than the thickness of the retaining plate 43 by an amount equal to the distance that the pistons 40 can move rearward. When the radially protruding portions 21 are in their neutral positions as shown in FIG. 3, the outer side walls of the retaining plates 43 bear on side walls formed at the outer side of the annular groove 41. Thus, further forward movement of each piston 40 is prevented.

In the operation of the novel mechanism constructed as described above, a hydraulic pump 50 (FIG. 2) such as a vane pump is driven by an automotive engine, so that working oil is discharged from the pump. When the amount of the oil exceeds a certain level, the superfluous oil is returned to a reservoir 59 by a bypass valve 51. Thus, a certain amount of working oil is delivered to a flow-dividing valve 52, where the oil is divided in a certain proportion between two channels respectively connected to a servovalve passage 54 and a reaction control passage 55. The working oil sent into the servovalve passage 54 is supplied from a support port 56 to the servovalve 26. As the input shaft 20 is rotated relative to the output shaft 30, the servovalve 26 allows working oil to be supplied to one chamber in the power cylinder 14. Then, the cylinder is actuated to give an assisting force to the output shaft 30. The working oil discharged from the other chamber in the cylinder 14 is returned to the reservoir 59 via the servovalve 26 and an exhaust port 57.

The pressure inside the reaction control passage 55 into which the working oil is forced is controlled by a solenoid relief valve 53. The oil is then introduced into one of the grooves 34 via an inlet port 58, a communication passage 58a, and the annular groove 35. Thus, the reaction pistons 40 push the radially protruding portions 21 approaching them, altering the characteristic of the torsion bar 25 extending between the shafts 20 and 30. As a result, the resistance to turning the steering wheel the driver encounters is varied. When the radially protruding portions 21 are rotated toward their respective pistons 40, the pistons 40 retreat while resisting the rotary motion. Backward movement of each piston 40 is permitted by a clearance left between the retaining plate 43 and the groove 41. However, when the retaining plate 43 comes into contact with the inner side surface of the groove 41, further backward movement of each piston is inhibited. When the output shaft 30 is taken out of the housing 10, the retaining plates 43 prevent the pistons 40 from disengaging from the cylinder holes 33.

Referring next to FIGS. 5 and 6, there is shown another mechanism that is similar to the mechanism already described except that the retaining plates 43 engage flattened round grooves 41a and 41b formed in the outer ends of the outer periphery of the pistons 40.

Referring to FIGS. 7 and 8, there is shown a further hydraulic reaction mechanism which is manufactured in accordance with the invention so as to be used with a power steering system. This mechanism is similar to the mechanism shown in FIGS. 5 and 6 except for the following points. Each reaction piston 40 has a frustoconical portion at its inner end. The retaining plates 43 engage the flattened round grooves 41a and 41b formed at the rear ends of the reaction pistons 40 to limit the forward and rearward movement of the pistons 40 and also to prevent the pistons from rotating. The retaining plates 43 are set much longer than the retaining plates 43 shown in FIGS. 5 and 6 to assure that the grooves 41a and 41b in the pistons 40 fit the U-shaped cutouts 43a formed at one end of each plate 43. In the present example, the pistons 40 are housed in the enlarged portion 31 of the output shaft 30. It is also possible to fabricate the enlarged portion 31 as a separate rotary member that rotates with the output shaft 31. Further, the enlarged portion 31 may be made integral with a sleeve valve member 25a (FIG. 2) constituting the servovalve 26.

As described thus far, in accordance with the invention, the cylindrical reaction pistons are provided with grooves in their outer peripheries. The front ends of the retaining plates rigidly fixed to the enlarged portion engage these grooves. Thus, the pistons are prevented from disengaging from the cylinder holes. When the output shaft is inserted into the housing, the pistons never come off whatever posture the shaft assumes. Hence, the mechanism can be assembled easily. Further, the reaction pistons are easy to machine, because only the grooves are required to be formed in the pistons.

Obviously, numerous modifications and variations of the present invention are possible in light of the above teachings. It is therefore to be understood that within the scope of the appended claims, the present invention may be practiced otherwise than as specifically described herein.

What is claimed is:

1. A hydraulic reaction mechanism for use with a power steering system, comprising:
   a housing;
   an input shaft and an output shaft which are mounted in a coaxial relation inside the housing so as to be rotatable relative to each other through a given angle;

a servovalve mounted in the housing and actuated in response to the relative movement between the input and output shafts;

a pair of radially protruding portions formed at the end of input shaft that is on the side of the output shaft, said pair of radially protruding portions being located at diametrically opposite sides of the input shaft;

a rotary member rotatably fitted in the housing and rotatable bodily with the output shaft, the rotary member having grooves that receive the radially protruding portions such that the protruding portions can rotate through a given angle, the rotary member being provided with two pairs of cylinder holes each pair of the cylinder holes having a common axis which extends in a direction perpendicular to a corresponding one of the protruding portions, wherein each pair of the cylinder holes comprises plain holes machinable from one side thereof;

a plurality of cylindrically shaped reaction pistons fitted in the cylinder holes for hydraulically pushing both sides of the radially protruding portions, each of the pistons being provided with a groove, running at right angles to the axis thereof; and a pair of retaining plates rigidly fixed to the outer periphery of the rotary member and each having opposite end portions engaging the grooves, of the pistons for restricting backward movement of the pistons away from the protruding portions and forward movement of the pistons toward the protruding portions.

2. A hydraulic reaction mechanism for use with a power steering system as set forth in claim 1, wherein the retaining plate is rigidly fixed to the rotary member at its center with a single bolt.

3. A hydraulic reaction mechanism for use with a power steering system as set forth in claim 1, wherein the retaining plate has U-shaped cutouts at both ends thereof, and wherein the pistons have flattened round engaging portions that engage the U-shaped cutouts.

* * * * *